(No Model.)

A. W. PARIS.
BOX.

No. 356,009. Patented Jan. 11, 1887.

Witnesses:
M. R. Curtis
M. C. Gibson

Inventor:
A. W. Paris
By
E. T. Gibson
His Attorney

N. PETERS, Photo-Lithographer, Washington, D. C.

UNITED STATES PATENT OFFICE.

ALFRED WILSON PARIS, OF MINNEAPOLIS, MINNESOTA.

BOX.

SPECIFICATION forming part of Letters Patent No. 356,009, dated January 11, 1887.

Application filed May 8, 1886. Serial No. 201,616. (No model.)

*To all whom it may concern:*

Be it known that I, ALFRED WILSON PARIS, a citizen of the United States, residing at Minneapolis, in the county of Hennepin and State of Minnesota, have invented a new and useful Improvement in Boxes for Candies, of which the following is a specification, reference being had to the accompanying drawings, forming part of this specification.

The object of my invention is to improve the construction of boxes in which caramels and other candies are transported and kept in stock.

Figure 1:
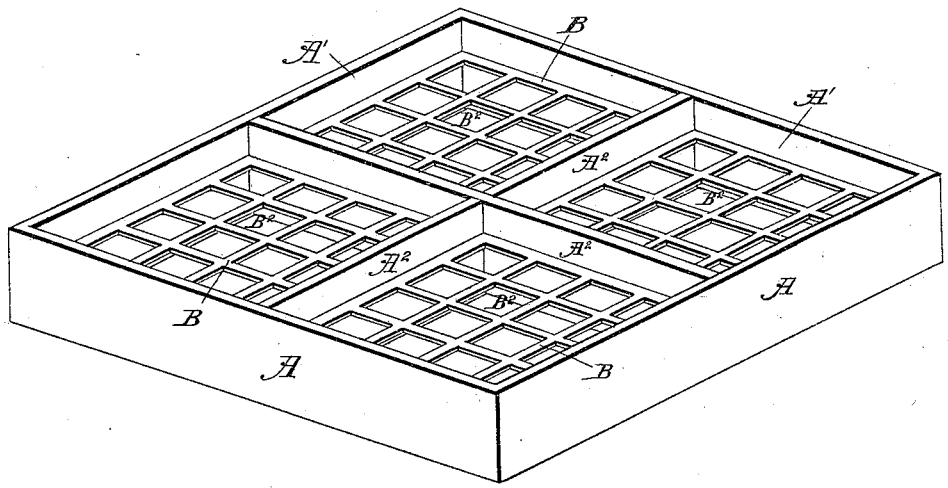
Figure 2:
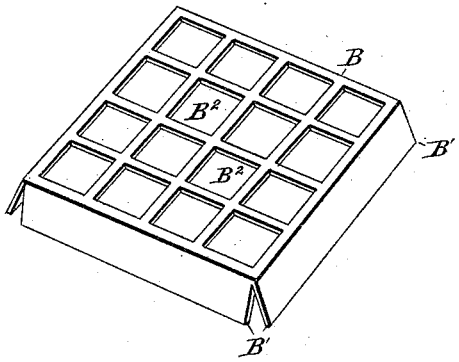

Figure 1 represents a perspective view of the box A, with its cover removed, so as to disclose its contents, and Fig. 2 represents a perspective view of the tray B, which forms a part of said box.

Dividing the box into four or more compartments, A′, are the partition-strips A². Supported in a horizontal position in the interior of each compartment is the plate or tray B, having along its four borders the flanges B′, turned at a right angle to said plate, whereby said tray or plate is secured to the inner surface of the walls of the compartment by means of glue, and at such a height above the bottom of the box as will prevent any lateral movement of the pieces of candy when said pieces are inserted into the holes B² in the tray B. The size and shape of said holes will of course depend upon the fancy of the candy manufacturer, as will also the material of which said tray B is to be composed. I prefer to use pasteboard; but wood, tin, or any other suitable material could be employed.

It will be seen that the walls of the compartments can be of a greater height than is represented in the drawings, and a series of perforated trays holding candies can be arranged in them, one above another, by simply inserting a solid plate of pasteboard or other suitable material between each layer of candies.

What I claim as new, and desire to secure by Letters Patent, is—

The combination, with a box for candies, of the strips A², secured thereto by means of glue in such a manner as to divide the interior of the box into compartments on the same plane, and the trays B, having perforations for the reception of the candies, and downwardly-bent flanges inserted into and secured to the sides of said compartments by means of glue.

ALFRED WILSON PARIS.

Witnesses:
 MYRON R. CURTIS,
 LEVI L. LONGBROKE.